(12) United States Patent
Trivedi et al.

(10) Patent No.: US 11,281,819 B2
(45) Date of Patent: Mar. 22, 2022

(54) SIMPLIFYING DESIGNS OF MECHANICAL ASSEMBLIES VIA GENERATIVE COMPONENT CONSOLIDATION

(71) Applicant: AUTODESK, INC., San Rafael, CA (US)

(72) Inventors: Abhishek Trivedi, Pleasant Hill, CA (US); Mehdi Nourbakhsh, Richmond, CA (US); Michael Bergin, El Cerrito, CA (US); Francesco Iorio, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 515 days.

(21) Appl. No.: 15/911,022

(22) Filed: Mar. 2, 2018

(65) Prior Publication Data

US 2019/0272356 A1    Sep. 5, 2019

(51) Int. Cl.
*G06F 30/17* (2020.01)
*G06F 30/20* (2020.01)
(Continued)

(52) U.S. Cl.
CPC .............. *G06F 30/17* (2020.01); *G06F 30/20* (2020.01); *G06F 2111/04* (2020.01); *G06F 2111/06* (2020.01); *G06F 2119/18* (2020.01)

(58) Field of Classification Search
CPC .......... G06F 30/00; G06F 30/17; G06F 30/20; G06F 2111/04; G06F 2111/06; G06F 2111/20; G06F 2119/18
See application file for complete search history.

(56) References Cited

U.S. PATENT DOCUMENTS

| | | | |
|---|---|---|---|
| 7,219,043 B2* | 5/2007 | Rebello | G05B 19/4097 703/7 |
| 7,751,917 B2* | 7/2010 | Rees | G06F 30/17 700/97 |

(Continued)

OTHER PUBLICATIONS

Ledermann, C., et al. "Dynamic CAD Objects for Structural Optimization in Preliminary Aircraft Design" Aerospace Science & Technology, vol. 10, pp. 601-610 (2006) (Year: 2006).*

(Continued)

*Primary Examiner* — Jay Hann
(74) *Attorney, Agent, or Firm* — Artegis Law Group, LLP

(57) ABSTRACT

A design engine consolidates portions of a mechanical assembly design to reduce the number of components included in the design. The design engine analyzes the design to determine various criteria associated with the assembly. Then, the design engine identifies a group of components within the design to be consolidated. The design engine determines a volumetric region where the group of components resides and then subdivides the volumetric region. The design engine then initiates a generative design process based on the determined criteria to create geometry within each subdivision of the volumetric region. The newly generated geometry includes fewer components than the initial group of components. The design engine then replaces the group of components with the newly generated geometry, thereby consolidating the group and reducing the total number of components included in the design.

22 Claims, 11 Drawing Sheets

(51) Int. Cl.
    *G06F 111/04*    (2020.01)
    *G06F 111/06*    (2020.01)
    *G06F 119/18*    (2020.01)

(56) References Cited

U.S. PATENT DOCUMENTS

| | | | | |
|---|---|---|---|---|
| 10,169,497 | B2* | 1/2019 | Saito | G06F 30/20 |
| 2005/0159936 | A1* | 7/2005 | Rees | G06F 30/17 |
| | | | | 703/6 |
| 2017/0024511 | A1* | 1/2017 | Cheong | G06F 30/17 |
| 2019/0056715 | A1* | 2/2019 | Subramaniyan | G06F 30/27 |
| 2019/0138673 | A1* | 5/2019 | Roberts | G06F 30/20 |
| 2019/0294754 | A1* | 9/2019 | Roberts | G06F 30/17 |

OTHER PUBLICATIONS

Yang, S., et al. "A New Part Consolidation Method to Embrace the Design Freedom of Additive Manufacturing" J. Manufacturing Processes, vol. 20, pp. 444-449 (2015) (Year: 2015).*
Pour, M. & Zanoni, S. "Impact of Merging Components by Additive Manufacturing in Spare Parts Management" Procedia Manufacturing, vol. 11, pp. 610-618, 27th Int'l Conf, on Flexible Automation & Intelligent Manufacturing, FAIM2017 (2017) (Year: 2017).*

* cited by examiner

SIMPLIFYING DESIGNS OF MECHANICAL ASSEMBLIES VIA GENERATIVE COMPONENT CONSOLIDATION

BACKGROUND

Field of the Various Embodiments

The various embodiments relate generally to computer-aided design and, more specifically, to simplifying designs of mechanical assemblies via generative component consolidation.

Description of the Related Art

In the context of mechanical design and engineering, an "assembly" is a collection of mechanical components that are coupled together according to a particular configuration. Assemblies range in complexity from simple assemblies that include only a handful of components to complex assemblies that include thousands of components. For example, a simple assembly could correspond to a bicycle wheel, while a complex assembly could correspond to a commercial aircraft.

Assemblies are typically designed to meet certain design criteria related to one or more functions the assembly is intended to perform. The design criteria can include design objectives that the assembly should meet as well as design constraints that the assembly should not violate in performing those functions. For example, a given design objective could indicate that the volume of the assembly should be minimized, and a given design constraint could indicate that the overall weight of the assembly should not exceed a maximum value.

In addition, assemblies are typically designed to meet engineering criteria related to the manufacturing and/or production of the assembly. Similar to design criteria, engineering criteria include engineering objectives that production of the assembly should meet and engineering constraints that production of the assembly should not violate. For example, a given engineering objective could indicate that the supply chain needed to produce the assembly should be minimized, and a given engineering constraint could indicate that the assembly should be capable of being produced within some maximum amount of time.

One drawback associated with complex assemblies, such as a commercial aircraft or automobile, is that meeting the engineering criteria delineated for such assemblies can be exceedingly difficult. In particular, the production of a complex assembly typically involves a correspondingly complex supply chain that can be exceedingly long and involve numerous suppliers. Lengthy supply chains may be vulnerable to multiple sources of inefficiency that can prevent the stated engineering criteria from being met. To address this issue, many designers and engineers strive to simplify the designs of complex assemblies in order to simplify the associated supply chains. However, simplifying the design of a complex assembly can prevent the design criteria from being met. In such situations, additional overhead and delay typically result because the simplified designs have to be modified in order to sufficiently comply with the design criteria.

As the foregoing illustrates, what is needed in the art are more effective techniques for designing complex mechanical assemblies that comply with both design and engineering criteria.

SUMMARY

Various embodiments include a computer-implemented method for automatically designing mechanical assemblies, including: determining a first group of components included in a first mechanical assembly design based on a first set of criteria, generating a first volumetric region that encapsulates the first group of components, identifying a first generative area within the first volumetric region based on a second set of criteria, subdividing the first generative area into a first plurality of subdivisions, generating geometry within each subdivision included in the first plurality of subdivisions based on a third set of criteria to form a first consolidated component, and replacing the first group of components with the first consolidated component to generate a modified mechanical assembly design, where the modified mechanical assembly design is mechanically simpler than the first mechanical assembly design.

At least one advantage of the disclosed techniques is that the design of a complex mechanical assembly can be simplified while preserving compliance with both design criteria and engineering criteria. Accordingly, the supply chain needed to produce the assembly can also be simplified, thereby reducing vulnerabilities to inefficiencies and decreasing overhead.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
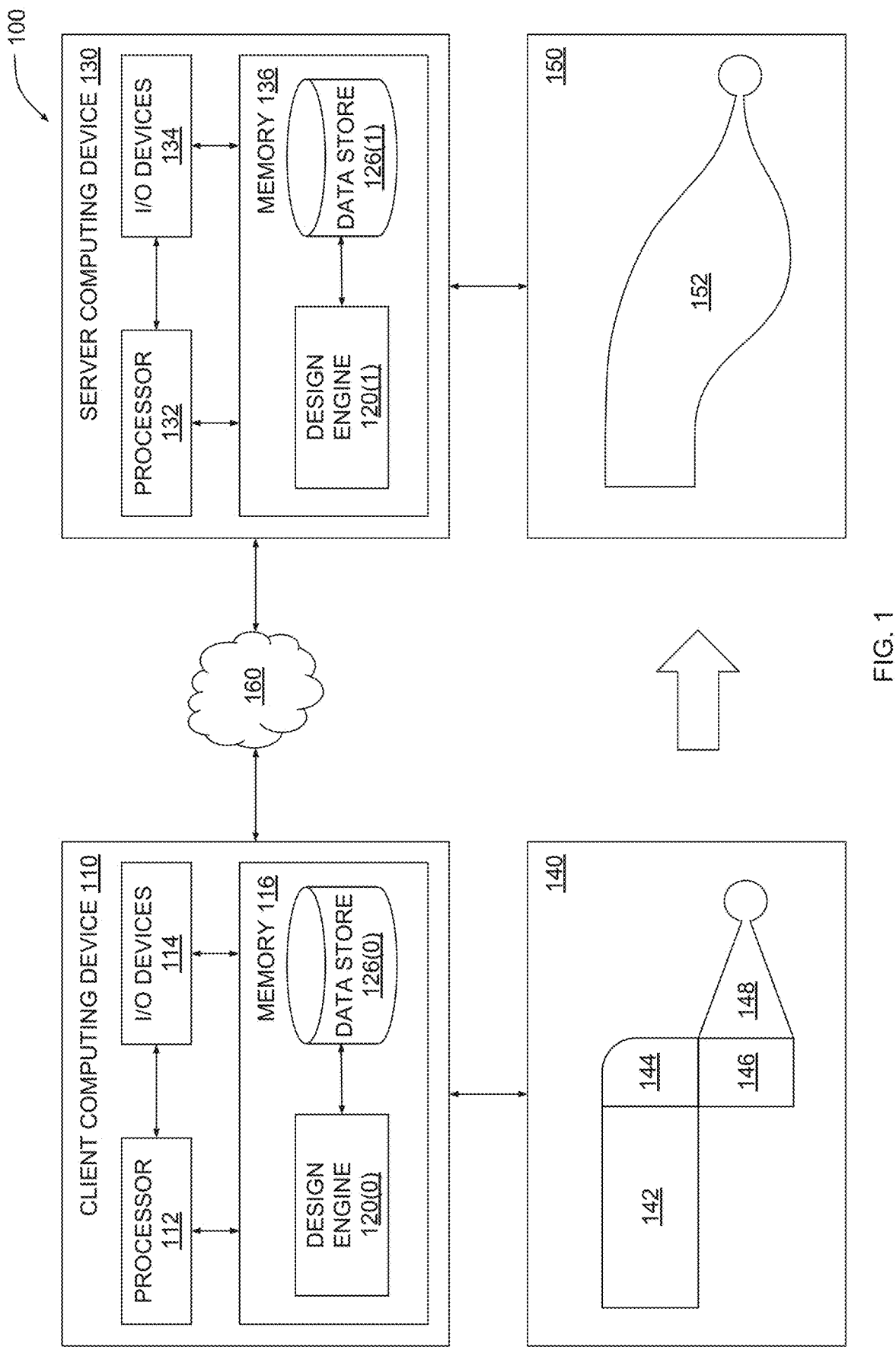
FIG. 1 illustrates a system configured to implement one or more aspects of the various embodiments.

In the following description, numerous specific details are set forth to provide a more thorough understanding of the various embodiments. However, it will be apparent to one of skilled in the art that the inventive concepts may be practiced without one or more of these specific details.

As noted above, a complex mechanical assembly is typically associated with a correspondingly complex supply chain. Complex supply chains are subject to a variety of inefficiencies. Consequently, engineering criteria associated with producing the assembly can be difficult to meet. Designers and engineers may therefore attempt to simplify the design of a complex assembly in an effort to simplify the supply chain and better meet the engineering criteria. However, simplifying a complex assembly design can reduce the degree to which the design criteria are met. When this occurs, the simplified assembly must be redesigned, at least in part, in order to comply with the design criteria, thereby increasing overhead and potentially offsetting any gains produced by simplification of the supply chain.

To address these issues, some embodiments include a design engine configured to consolidate portions of a design for a mechanical assembly to reduce the number of components included in the assembly. The design engine analyzes the mechanical assembly design to determine various criteria, including design criteria and engineering criteria. Then, the design engine identifies a group of components to be consolidated. The design engine determines the loading requirements of the group of components, any adjacent components interfacing with the group of components, and a volumetric region where the group of components resides, among other things. The design engine subdivides the volumetric region according to one or more division strategies. The design engine then initiates a generative design process to create geometry within the volumetric region according to the different subdivision strategies. For each strategy, the design engine creates geometry in a manner that meets the criteria determined previously. The newly created geometry may be functionally and/or logistically equivalent (or superior) to the group of components. The design engine evaluates the different geometry created and then selects the geometry that optimally meets some or all criteria. The design engine may then replace the initially identified group of components with the newly generated geometry, thereby consolidating the group and reducing the number of components included in the mechanical assembly design.

At least one advantage of these techniques is that a complex mechanical assembly designs can be simplified while preserving compliance with both design criteria and engineering criteria. Accordingly, the supply chain associated with the assembly can also be simplified, thereby reducing vulnerabilities to inefficiencies and decreasing overhead. Because these techniques improve how complex engineering designs are manufactured, the disclosed techniques confer a significant advantage compared to conventional approaches that are subject to greater inefficiencies and excessive overhead.

System Overview

FIG. 1 illustrates a system configured to implement one or more aspects of the present embodiments. As shown, a system 100 includes a client computing device 110 coupled to a server computing device 130 via a network 150.

Client computing device 110 includes a processor 112, input/output (I/O) devices 114, and a memory 116, coupled together. Processor 112 includes any technically feasible set of hardware units configured to process data and execute software applications. For example, processor 112 could include one or more of a central processing unit (CPU), a graphics processing unit (GPU), and an application specific integrated circuit (ASICs). I/O devices 114 include any technically feasible set of devices configured to perform input and/or output operations, including, for example, a display device, a keyboard, a mouse, and a touchscreen, among others. Memory 116 includes any technically feasible set of storage media configured to store data and software applications, such as a hard disk, a random-access memory (RAM) module, and a read-only memory (ROM), for example. Memory 116 includes a design engine 120(0) and a data store 126(0). Design engine 120(0) is a software application that, when executed by processor 112, interoperates with a corresponding design engine executing on server computing device 130, as described in greater detail below.

Server computing device 130 includes a processor 132, I/O devices 134, and memory 136, coupled together. Processor 132 includes any technically feasible set of hardware units configured to process data and execute software applications. I/O devices 134 include any technically feasible set of devices configured to perform input and/or output operations. Memory 136 includes any technically feasible set of storage media configured to store data and software applications. Memory 136 includes a design engine 120(1) and a data store 126(1). Design engine 120(1) is a software application that, when executed by processor 132, interoperates with design engine 120(0) to consolidate components of mechanical assembly designs to simplify those designs.

As a general matter, design engine 120(0) and design engine 120(0) 120(1) cooperate to implement any and all of the inventive functionality described herein and therefore may be considered to represent different portions of single distributed software entity. Thus, for simplicity, design engines 120(0) and 120(1) are referred to hereinafter collectively as design engine 120. Similarly, data stores 126(0) and 126(1) represent different portions of a single distributed storage entity. Therefore, for simplicity, data stores 126(0) and 126(1) may be referred to collectively as data store 126.

In operation, design engine 120 analyzes designs of mechanical assemblies to identify groups of components that can be consolidated into fewer components. For example, design engine 120 could analyze exemplary assembly design 140 to identify components 142, 144, 146, and 148. Then, design engine 120 generates geometry that is functionally and/or logistically equivalent (or superior) to the identified group or groups of components. For example, design engine 120 could generate component 152 included in simplified design 150. Component 152 meets the same design criteria as components 142, 144, 146, and 148 and is therefore equivalent to those components from a functional perspective. Component 152 also meets the same engineering criteria as components 142, 144, 146, and 148 and is therefore equivalent to those components from a logistical perspective, as well.

Component 152 may also exceed the degree to which the design and engineering criteria are met compared to components 142, 144, 146, and 148 and therefore be considered "superior." For example, component 152 could have a greater strength-to-weight ratio compared to components 142, 144, 146, and 148, and therefore be considered superior to those components from a functional perspective. In another example, component 152 could have a shorter manufacturing time compared to components 142, 144, 146, and 148, and therefore be considered superior to those components from a logistical perspective.

In manner described above, design engine 120 is configured to simplify designs of mechanical assemblies by consolidating portions of those designs, potentially improving the designs from a functional and/or logistical standpoint. As a general matter, a design of a given mechanical assembly may be considered simpler compared to a previous design, in a mechanical context, when the given design includes fewer components then the previous design. In addition, a given design may be considered simpler than the previous design when the given design includes fewer connections than the previous design, less mass than the previous design, or a smaller volume than the previous design, among other physical properties that can be simplified and/or reduced. Design engine 120 implements various software modules in order to generate simplified mechanical assembly designs. Those software modules are discussed in greater detail below in conjunction with FIG. 2.

Figure 2:
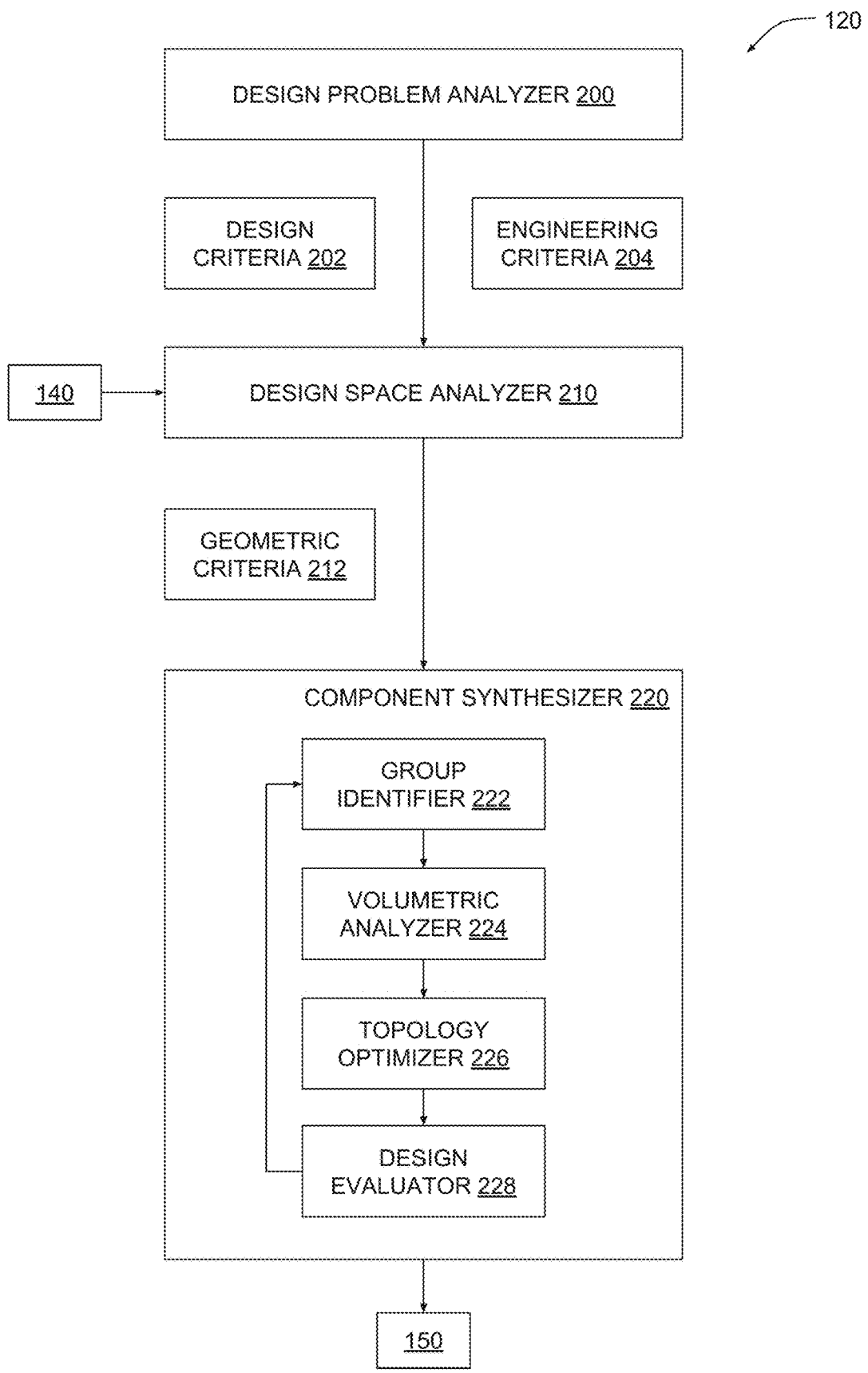
FIG. 2 is a more detailed illustration of the design engine of FIG. 1, according to various embodiments.

FIG. 2 is a more detailed illustration of the design engine of FIG. 1, according to various embodiments. As shown, design engine 120 includes a design problem analyzer 200, a design space analyzer 210, and a component synthesizer 220. The various modules shown interoperate to derive simplified design 150 from assembly design 140 in a manner that addresses the original design problem associated with assembly design 140.

Design problem analyzer 200 is a software module configured to analyze the above-mentioned design problem to determine design criteria 202 and engineering criteria 204. Design criteria 202 may include one or more objective functions as well as one or more constraint functions. The objective functions may be formulated as mathematical expressions that should be minimized or maximized by assembly design 140 (or any derivative design). For example, a given objective function could indicate that mass should be minimized. The constraint functions may be formulated as mathematical inequalities that should be respected by assembly design 140 (or any derivative design). For example, a given constraint function could indicate that volume should not exceed a particular value. Generally, design criteria 202 describe the desired functional and/or physical behavior of assembly design 140, and can therefore be used to generate simplified versions of this design that preserve compliance with desired behavior.

Engineering criteria 204 may include one or more objective functions related to the production and/or manufacturing of assembly design 140, and may be formulated as mathematical expressions that should be minimized or maximized by assembly design 140 (or any derivative design). Engineering criteria 204 may also include one or more constraint functions related to the production and/or manufacture of assembly design 140, and may be formulated as mathematical inequalities that should be respected by assembly design 140 (or any derivative design). As a general matter, engineering criteria 204 describe the degree of manufacturability of assembly design 140, and can therefore be used to generate simplified versions of this design with greater manufacturability.

In addition, design criteria 202 and engineering criteria 204 may also include objective and/or constraint functions defining how component consolidation should occur when deriving simplified design 150 from assembly design 140. For example, a given design criteria 202 could indicate that a consolidated component included in simplified design 150 should have a lower mass compared to an equivalent set of components included in assembly design 140. In another example, a given engineering criteria 204 could indicate that simplified design 150 should be manufacturable within a shorter timeframe compared to assembly design 140. Accordingly, design criteria 202 and engineering criteria 204 describe not only the desired behavior associated with assembly design 140 but also desired improvements that should be achieved by simplified design 150.

Design space analyzer 210 is a software module configured to analyze assembly design 140, as well as design criteria 202 and engineering criteria 204, in order to generate geometric criteria 212. Geometric criteria 212 generally represent geometric constraints that should be respected when consolidating components for simplified design 150. For example, geometric criteria 212 could indicate specific components included in assembly design 140 that should be coupled to newly formed consolidated components included in simplified design 150. Geometric criteria 212 could also indicate components of assembly design 140 that should be preserved when generating simplified design 150. Further, geometric criteria 212 could also indicate regions of assembly design 140 that may interfere with a generative design process used to synthesize consolidated components for simplified design 150. Design space analyzer 210 transmits the various criteria to component synthesizer 220.

Component synthesizer 220 is a software module configured to analyze the various criteria discuss thus far in conjunction with analyzing assembly design 140 to generate simplified design 150. Component synthesizer 220 includes a group identifier 222, a volume analyzer 224, a topology optimizer 226, and a design evaluator 228. Group identifier 222 is configured to analyze assembly design 140 and identify groups of components that are candidates for consolidation. Group identifier 222 may implement any technically feasible consolidation criteria to identify groups. For example, group identifier 222 could identifying groups of contiguous components configured to be welded together. Then, for a given group, volume analyzer 224 determines a volumetric region surrounding the group and analyzes that region to identify boundary conditions, among other things. Volume analyzer 224 also then subdivides that region according to different subdivision strategies.

For a given set of subdivisions, topology optimizer 226 performs a generative design process to generate geometry that meets the various criteria discussed thus far. In doing so, topology optimizer 226 may consider subsets of that criteria specifically relevant to the identified group of components, including proximate boundary conditions, loading parameters, and so forth. In this manner, topology optimizer 226 generates a spectrum of options for replacing the group of components with one or more consolidated components. Design evaluator 228 then evaluates those options to determine if a convergence criterion has been met. Design evaluator 228 could, for example, evaluate an objective function with the various options to determine which option minimizes the objective function. If convergence is not determined, the optimization process described above may repeat. The optimization process may repeat multiple times for each group of components or may repeat multiple times for assembly design 140 as a whole. In either case, when design evaluator 228 determines that convergence has occurred, component synthesizer 220 outputs simplified design 150, which includes specific groups of components replaced with consolidated versions of those components.

According to the technique described above, design engine 120 is capable of simplifying designs of complex mechanical assemblies in a manner that maintains compliance with design criteria and engineering criteria. A simplified mechanical assembly design generated in this manner may have a correspondingly simpler supply chain. With a simpler supply chain, many sources of inefficiency can be eliminated, thereby reducing overhead associated with producing mechanical assemblies. FIGS. 3-7C set forth an example of how design engine 120 simplifies mechanical assemblies.

Exemplary Simplification of a Mechanical Assembly Design

Figure 3:
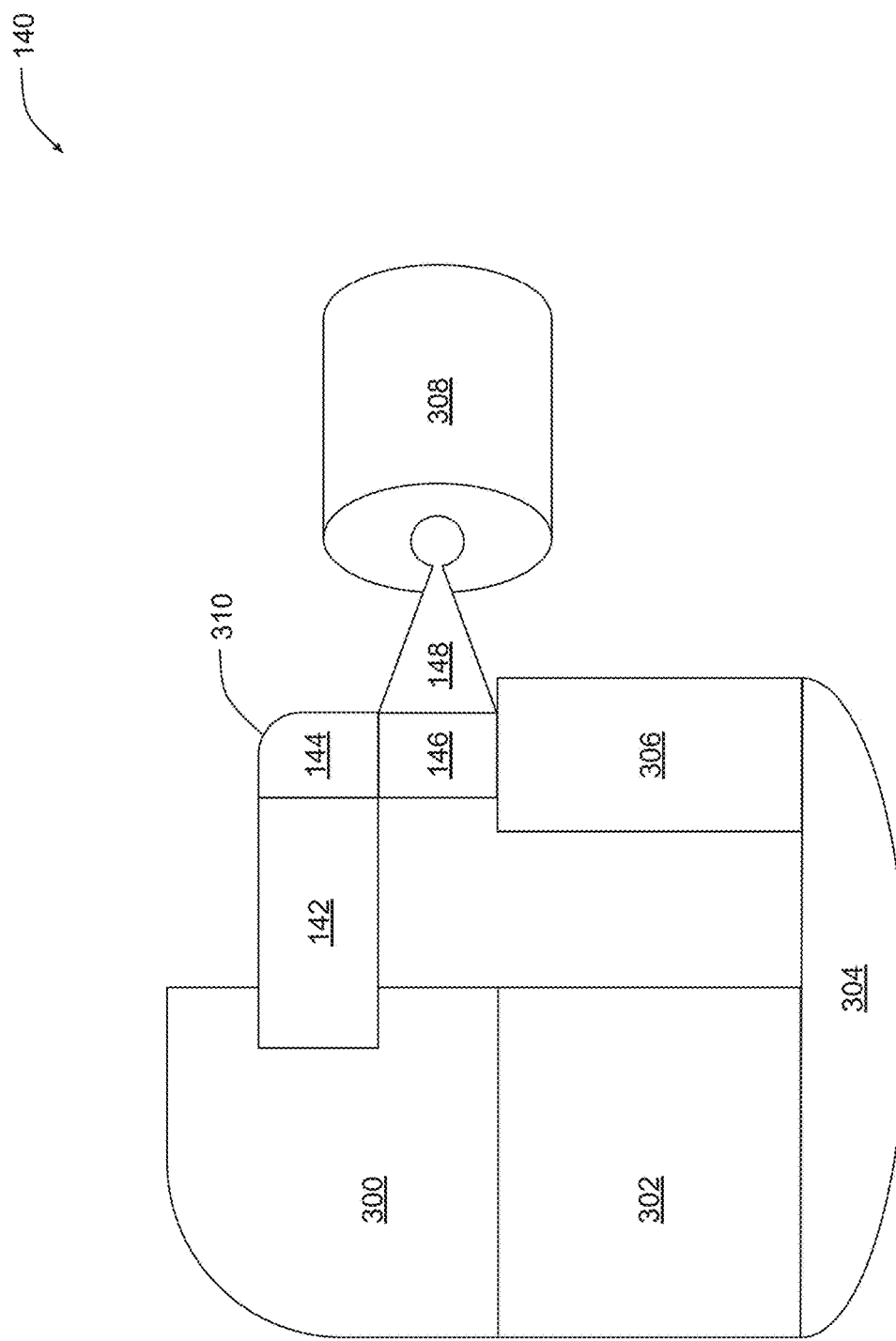
FIG. 3 is a more detailed illustration of the assembly design of FIG. 1, according to various embodiments.

FIG. 3 is a more detailed illustration of the assembly design of FIG. 1, according to various embodiments. As shown, assembly design 140 includes components 142, 144, 146, and 148, as also shown in FIG. 1, as well as components 300, 302, 304, 306, and 308. Components 142, 144, 146, and 148 form a group 310 of components. Design engine 120 is configured to collect these components into group 310 via group identifier 222 in the manner described above in conjunction with FIG. 2. Design engine 120 may implement any technically feasible criteria for identifying groups of components. For example, design engine 120 could identify two or more components configured to be physically welded together, because these two components eventually are rigidly coupled together into a single component and could therefore be consolidated. Once design engine 120 identifies group 310 of components, then design engine 120 analyzes the design space associated with that group of components, as described in greater detail in conjunction with FIG. 4.

Figure 4:
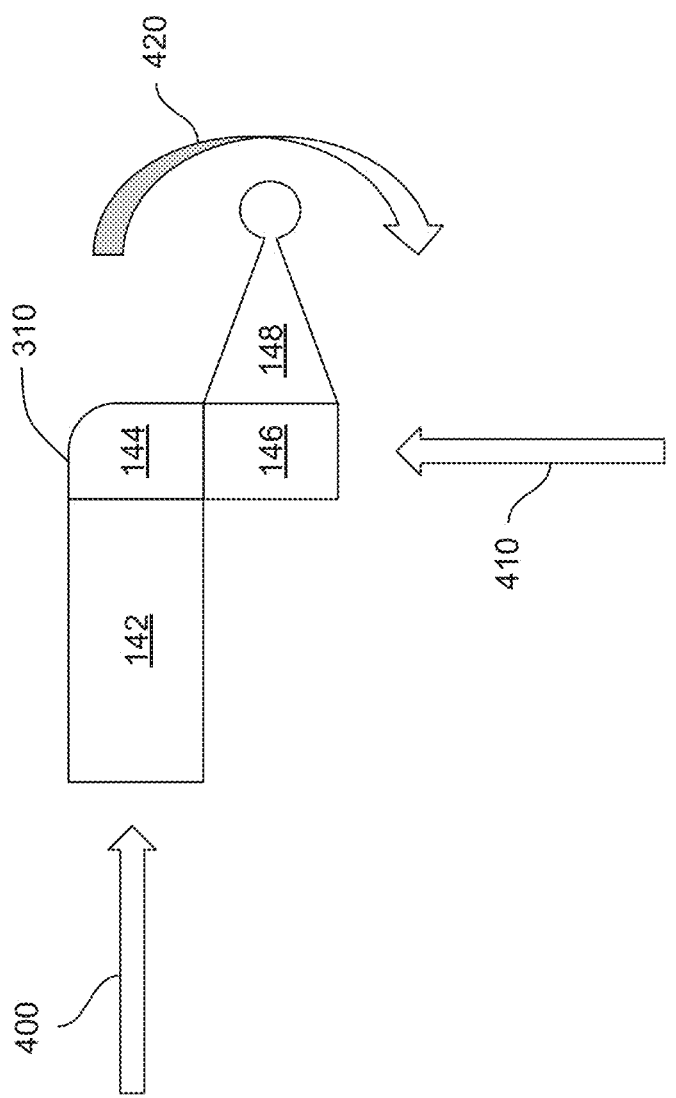
FIG. 4 illustrates a set of forces associated with the assembly design of FIG. 1, according to various embodiments.

FIG. 4 illustrates a set of forces associated with the assembly design of FIG. 1, according to various embodiments. As shown, force 400 acts on component 142 of group 310, force 410 acts on component 146 of group 310, and torque 420 acts on component 148 of group 310. Design engine 120 is configured to determine the different forces and torques acting on group 310 when analyzing boundary conditions via volumetric analyzer 222. In doing so, design engine 120 may determine the different forces and torques acting on group of 310 based on design criteria 202 generated by design problem analyzer 200 and/or based on geometric criteria 212 generated by design space analyzer 210. Conceptually, the determined forces and torques acting group 310 represent design criteria specific to group 310. These group specific design criteria can be used to drive the design of simpler geometry that may replace the various components included in group 310. Volumetric analyzer 224 then generates a volumetric region that surrounds and/or encapsulates group 310, as described in greater detail below in conjunction with FIG. 5.

Figure 5:
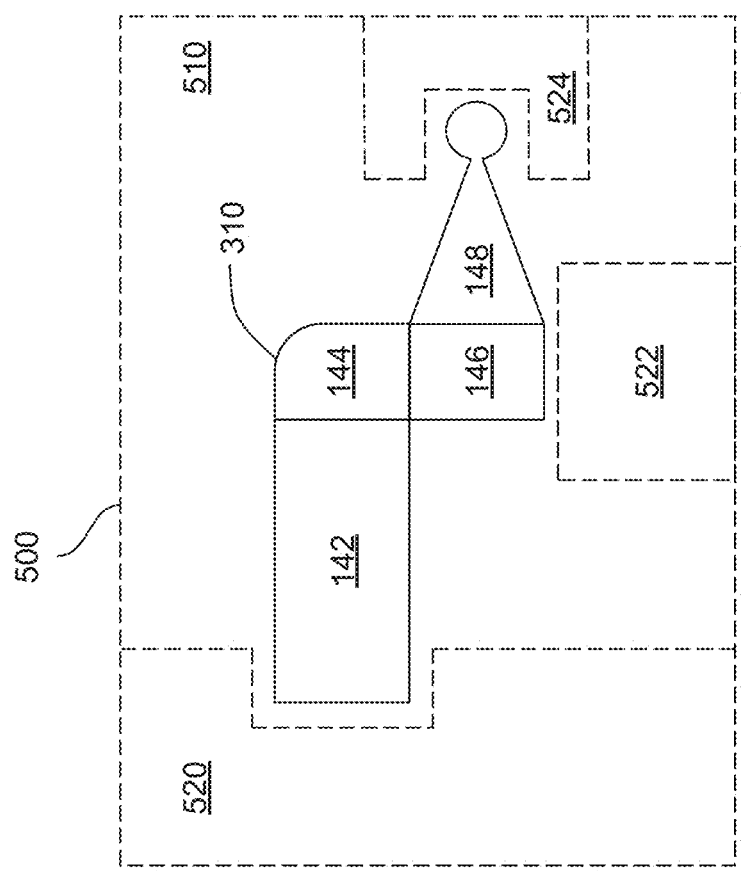
FIG. 5 illustrates a volumetric region associated with the assembly design of FIG. 1, according to various embodiments.

FIG. 5 illustrates a volumetric region associated with the assembly design of FIG. 1, according to various embodiments. As shown, a volumetric region 500 includes group 310. Volumetric region 500 may be a three-dimensional (3D) region of space encapsulating all components of group 310. Volumetric analyzer 224 determines volumetric region 500 based on the geometry of the group of 310. Volumetric region 500 includes subregions 510, 520, 522, and 524. These different subregions represent areas where a generative design process is either permitted to generate geometry or not permitted to generate geometry. For example, the generative design process is permitted to generate geometry within region 510, because no previously existing components reside in that region. This type of region may be referred to as a "generative region." By contrast, the generative design process is not permitted to generate geometry within regions 520, 522, or 524 because other components of assembly design 140 occupy these regions. For example, component 306 shown in FIG. 3 occupies subregion 522. These types of regions may be referred to as "non-generative regions." Volumetric analyzer 224 is configured to identify the different subregions shown based on geometric criteria 212. Then, volumetric analyzer 224 subdivides subregion 510 using different subdivision strategies, as described in greater detail in conjunction with FIG. 6A-6B.

Figure 6A:
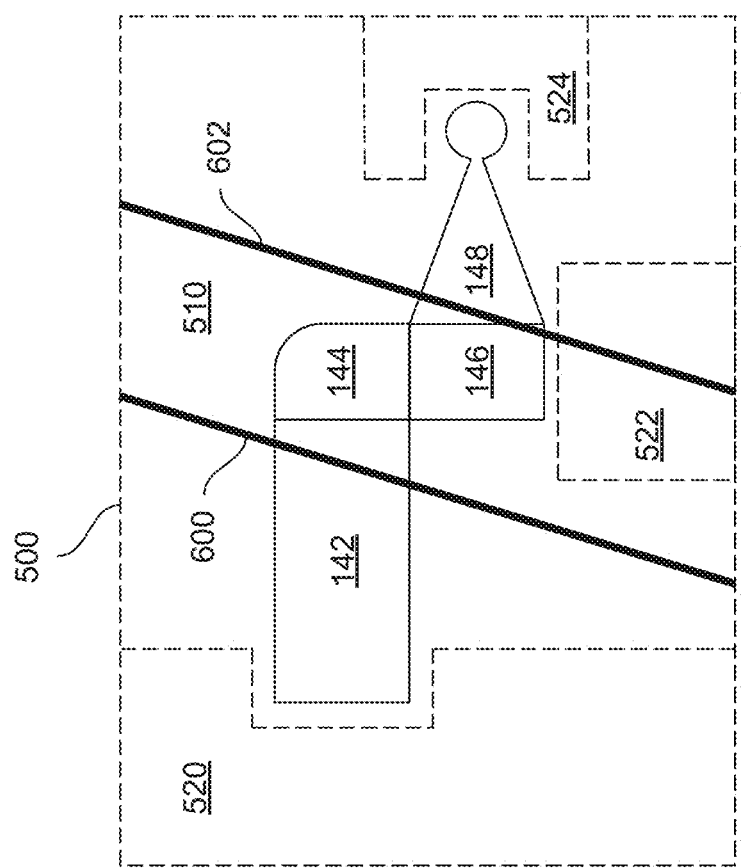
FIGS. 6A-6B illustrate exemplary subdivisions within the volumetric region of FIG. 5, according to various embodiments.
Figure 6B:
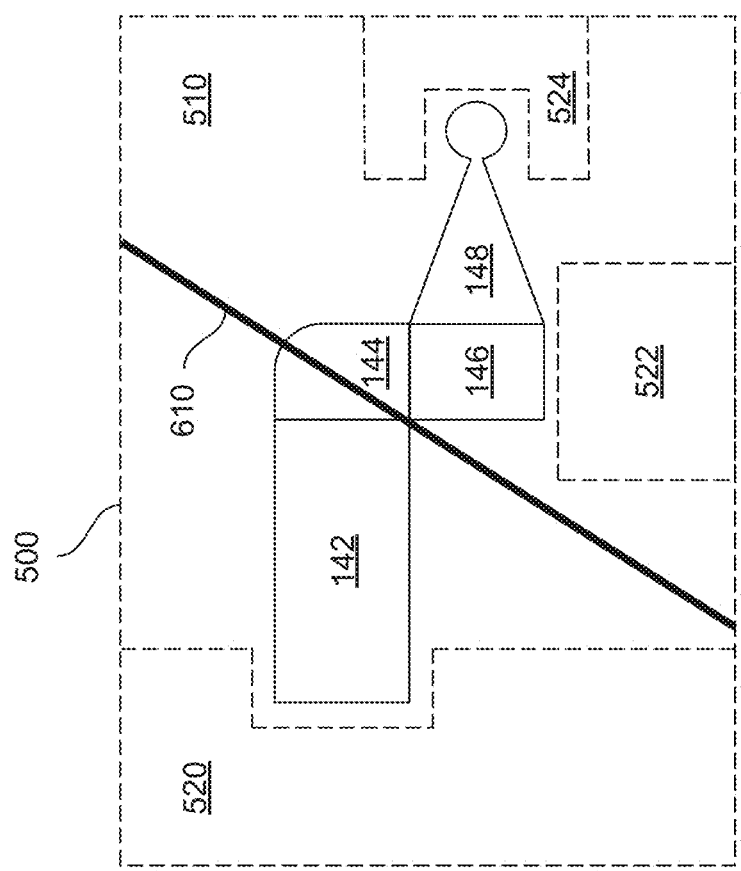

FIGS. 6A-6B illustrate exemplary subdivisions within the volumetric region of FIG. 5, according to various embodiments. Volumetric analyzer 224 is configured to subdivide volumetric region 500 of FIG. 5 by implementing different subdivision strategies. When implementing a given strategy, volumetric analyzer 224 places one or more boundaries within volumetric region 500 at specific locations. For example, as shown in FIG. 6A, volumetric analyzer 224 places boundaries 600 and 602 within volumetric region 500. In another example, as shown in FIG. 6B, volumetric analyzer 224 places boundary 610 within volumetric region 500. Volumetric analyzer 224 may subdivide volumetric region 500 according to many different subdivision strategies. In doing so, volumetric analyzer 224 may determine specific locations and orientations for boundaries randomly, using a genetic algorithm, or via an optimization process, among other possibilities. Each different subdivided version of volumetric region 500 can be used to initialize a generative design process that is implemented by topology optimizer 226, as described in greater detail below in conjunction with FIGS. 7A-7C.

Figure 7A:
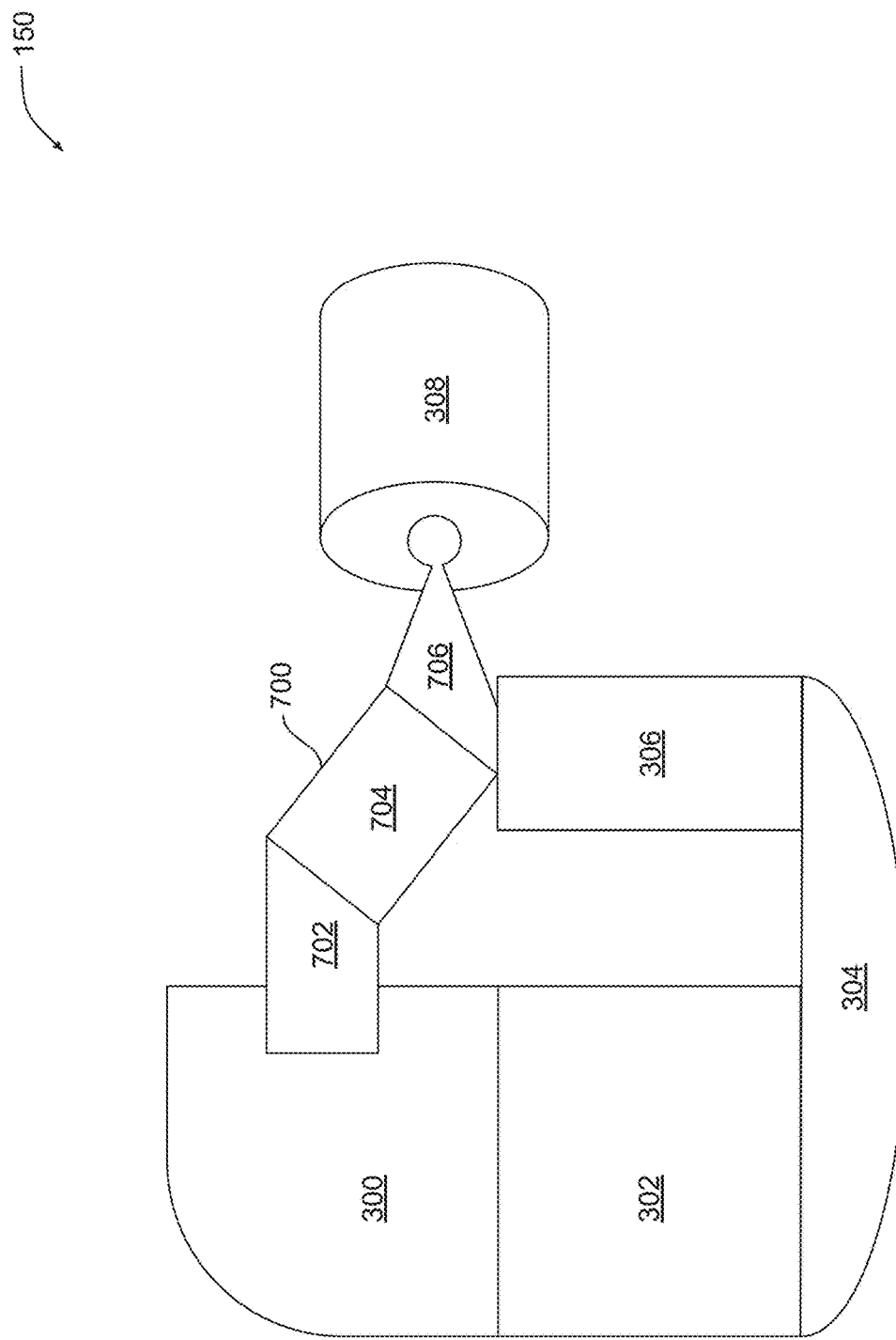
FIGS. 7A-7C illustrate exemplary consolidated components that replace a portion of the assembly design of FIG. 1, according to various embodiments.
Figure 7B:
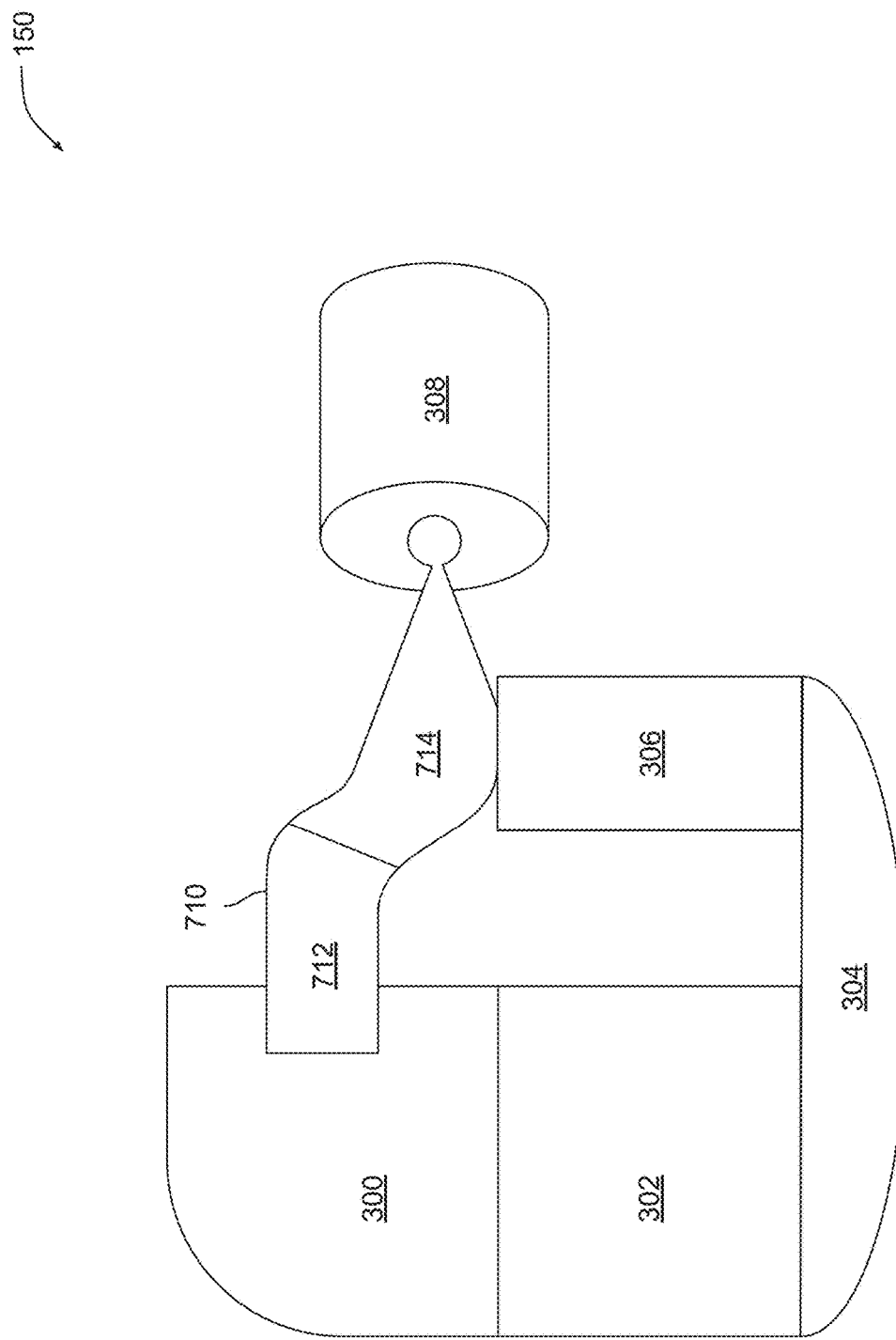
Figure 7C:
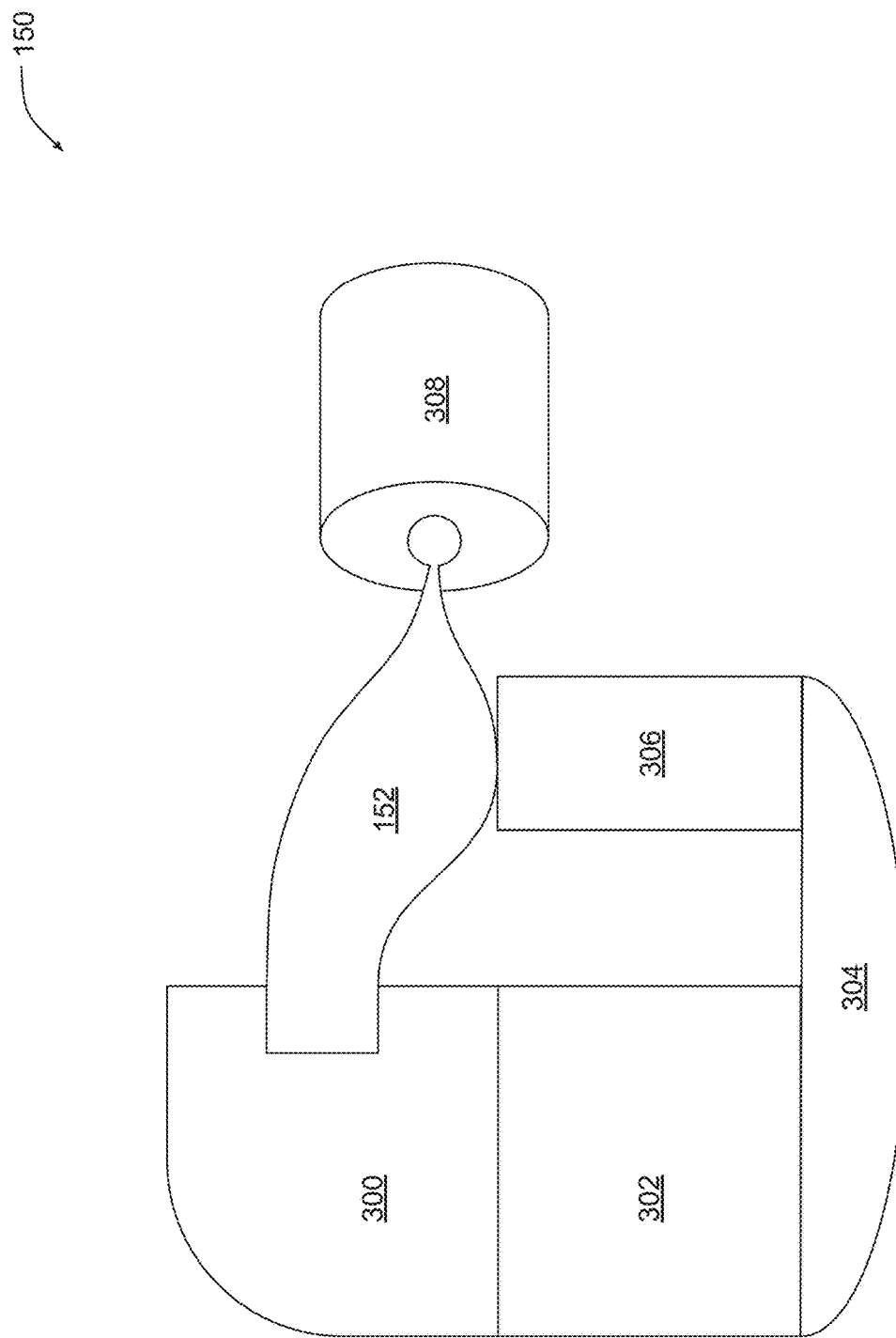

FIGS. 7A-7C illustrate exemplary consolidated components that replace a portion of the assembly design of FIG. 1, according to various embodiments. Topology optimizer 226 generates the different consolidated components shown in these figures in a manner that complies with design criteria 202, engineering criteria 204, and geometric criteria 212. FIGS. 7A-7B illustrate consolidated components generated based on the subdivision strategies shown in FIGS. 6A-6B, respectively. FIG. 7C illustrates how consolidated component 152 of FIG. 1 is generated without first implementing a subdivision strategy.

As shown in FIG. 7A, simplified design 150 includes some of the same components as assembly design 140. However, simplified design 150 includes consolidated component 700 instead of group 310 of components. Consolidated component 700 includes components 702, 704, and 706. Topology optimizer 226 generates consolidated component 700 to be functionally equivalent or superior to group 310 of components. To do so, topology optimizer 226 may execute a multi-objective solver based on design criteria 202, engineering criteria 204, and geometric criteria 212. Topology optimizer 226 may generate components 702, 704, and 706 based on boundaries 600 and 602 shown in FIG. 6A. For example, topology optimizer 226 could "grow" components 702, 704, and 706, using a generative design process initiated at boundaries 600 and 602 and driven by the various criteria described thus far.

As shown in FIG. 7B, simplified design 150 includes some of the same components as assembly design 140, but also includes consolidated component 710 instead of group 310 of components. Consolidated component 710 includes components 712 and 714. Topology optimizer 226 generates consolidated component 710 to be functionally equivalent or superior to group 310 of components. Topology optimizer 226 may implement a similar generative design process as that described above in conjunction with FIG. 7A. Topology optimizer 226 may generate components 710 and 712 based on boundary 610 shown in FIG. 6B. For example, topology optimizer 226 could "grow" components 712 and 714 using a generative design process initiated at boundary 610 and driven by the various criteria described thus far.

Referring generally FIGS. 7A-7B, the consolidated components shown in these figures are generated according to the boundaries shown in FIGS. 6A-6B, respectively, as mentioned. Topology optimizer 226 may also generate consolidated components within volumetric region 500 without first subdividing that region. In particular, as shown in FIG. 7C, topology optimizer 226 generates consolidated component 152 without first placing any boundaries within volumetric region 500. Accordingly, consolidated component 152 is not subdivided and can therefore be manufactured as a single part. Similar to the other consolidated components discussed thus far, consolidated component 152 is functionally equivalent or superior to group 310 of components.

Referring generally to FIGS. 3-7C, design engine 120 implements the process described above in order to generate one or more different consolidated components that can replace groups of components. Design engine 120 may then implement design evaluator 228 in order to determine whether a convergence criterion has been met. For example, design evaluator 228 could determine that consolidated component 152 minimizes an objective function included in design criteria 202 more effectively compared to other consolidated components and/or compared to group 310. Design engine 120 could then replace group 310 with consolidated component 152 to generate simplified design 150.

In one embodiment, based on the evaluation performed by design evaluator 228, design engine 120 may determine that the optimization process should be repeated with different groupings of components. For example, via design evaluator 228, design engine 120 may determine that each of consolidated components 700, 710, and 152 is functionally or logistically inferior to group 310. In this situation, design engine 120 may reinitialize the optimization process and group together components of assembly design 140 differently.

Procedure for Simplifying the Design of a Mechanical Assembly

Figure 8:
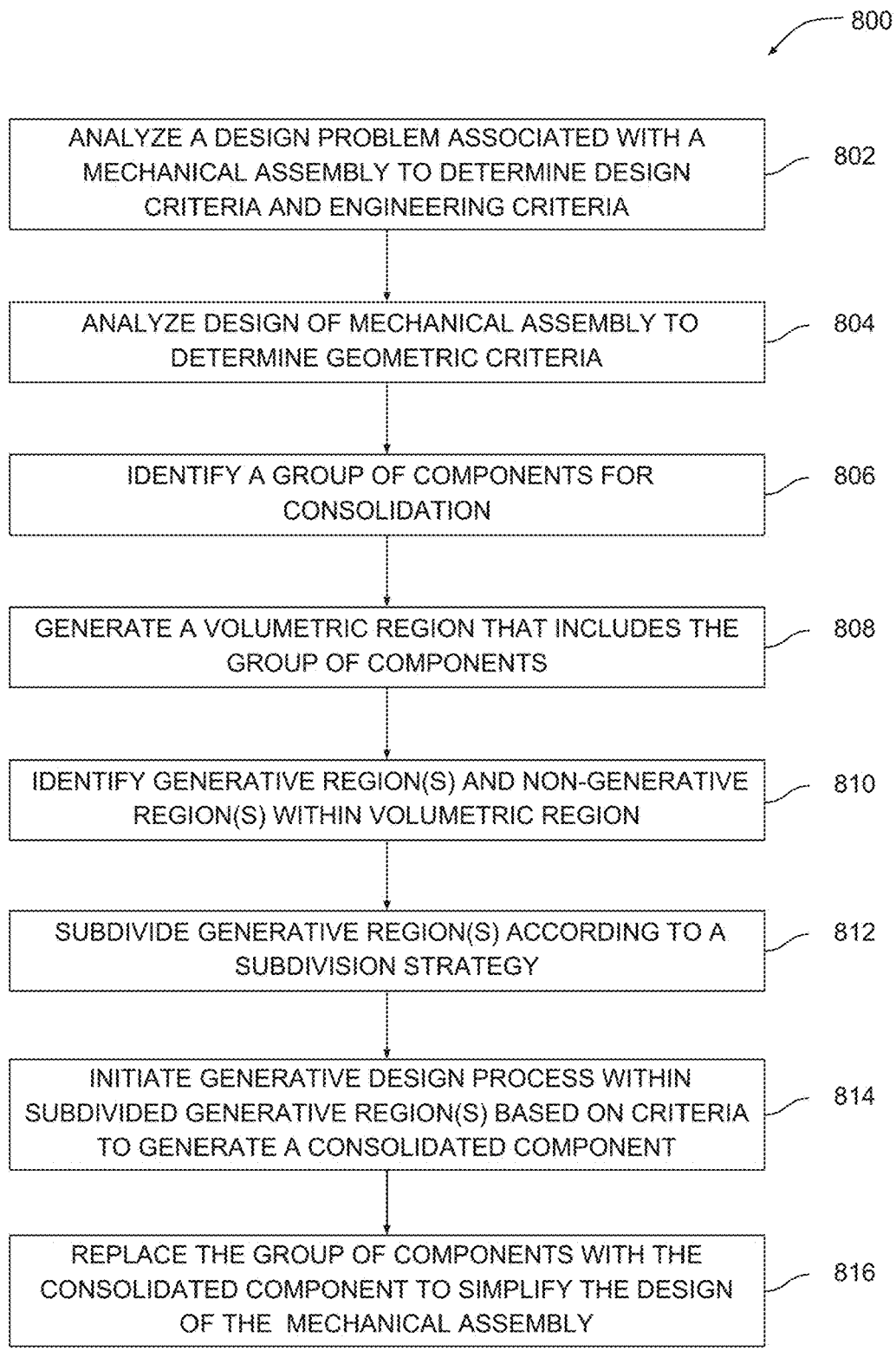
FIG. 8 is a flow diagram of method steps for simplifying the design of a mechanical assembly via generative component consolidation, according to various embodiments.

FIG. 8 is a flow diagram of method steps for simplifying the design of a mechanical assembly via generative component consolidation, according to various embodiments. Although the method steps are described in conjunction with the systems of FIGS. 1-7C, persons skilled in the art will understand that any system may be configured to perform the method steps in any order.

As shown, method 800 begins at step 802, where design engine 120 analyzes a design problem associated with a mechanical assembly to determine design criteria and engineering criteria associated with that assembly. The design criteria generally relate to the functional specifications of the assembly, whereas the engineering criteria relate to logistical parameters associated with producing the assembly. At step 804, the design engine analyzes a design of the mechanical assembly to determine geometric criteria associated with that design. The geometric criteria may include specific physical couplings between components of the design, various ports within the design where forces are conducted, as well as boundary conditions associated with the design.

At step 806, design engine 120 identifies a group of components that are candidates for consolidation. For example, design engine 120 could identify a group of components configured to be physically welded together during production, thereby forming a cohesive rigid body. Such groups of components may be replaced with a single component. At step 808, design engine 120 generates a volumetric region that includes the group of components.

At step 810, the design engine 120 identifies generative regions and non-generative regions within the volumetric region. Design engine 120 identifies these different regions based on the geometric criteria determined at step 804. Generative regions identified at step 810 may be empty in the initial mechanical assembly, or may include the group of components. Non-generative regions identified at step 810 may include components of the mechanical assembly that should not be replaced.

At step 812, design engine 120 subdivides the generative regions by placing boundaries within those regions. These boundaries may define initialization points for a generative design process. At step 814 design engine 120 initiates a generative design process within the generative regions based on the various criteria associated with the mechanical assembly to generate a consolidated component. The consolidated component generated at step 814 may be functionally and/or logistically equivalent or superior to the group of components identified at step 806. At step 816, design engine 120 replaces the group of components identified at step 806 with the consolidated component generated at step 814 to simplify the design of the mechanical assembly.

In sum, a design engine consolidates portions of a design of a mechanical assembly to reduce the number of components included in the design. The design engine analyzes the mechanical assembly design to determine various criteria associated with the assembly. Then, the design engine identifies a group of components within the design that can be consolidated. The design engine determines the loading requirements of the group of components, any adjacent components interfacing with the group of components, and a volumetric region where the group of components resides, among other things. The design engine subdivides the volumetric region according to one or more division strategies. The design engine then initiates a generative design process to create geometry within the volumetric region according to the different subdivision strategies. For each strategy, the design engine creates geometry in a manner that meets the criteria determined previously. The newly created geometry may be functionally and/or logistically equivalent (or superior) to the group of components. The design engine evaluates the different geometry created and then selects the geometry that optimally meets all criteria. The design engine may then replace the initially identified group of components with the newly generated geometry, thereby consolidating the group and reducing the number of components included in the design of the mechanical assembly.

At least one advantage of the disclosed techniques is that the design of a complex mechanical assembly can be simplified while preserving compliance with both design criteria and engineering criteria. Accordingly, the supply chain needed to produce the assembly can also be simplified, thereby reducing vulnerabilities to inefficiencies and decreasing overhead. Because these techniques improve how complex engineering assemblies are manufactured, the disclosed techniques confer a significant technological improvement relative to conventional approaches that are subject to greater inefficiencies and excessive overhead.

1. Some embodiments include a computer-implemented method for automatically designing mechanical assemblies, the method comprising: determining a first group of components included in a first mechanical assembly design based on a first set of criteria; generating a first volumetric region that encapsulates the first group of components; identifying a first generative area within the first volumetric region based on a second set of criteria; subdividing the first generative area into a first plurality of subdivisions; generating geometry within each subdivision included in the first plurality of subdivisions based on a third set of criteria to form a first consolidated component; and replacing the first group of components with the first consolidated component to generate a modified mechanical assembly design, wherein the modified mechanical assembly design is mechanically simpler than the first mechanical assembly design.

2. The computer-implemented method of clause 1, wherein the first set of criteria indicates that each component included in the first group of components should be coupled to at least one other component included in the first group of components.

3. The computer-implemented method of any of clauses 1 and 2, wherein the second set of criteria indicates that the first generative area does not include any components included in the first mechanical assembly design that are not included in the first group of components.

4. The computer-implemented method of any of clauses 1, 2, and 3, wherein the third set of criteria includes a first set of design criteria and a first set of engineering criteria.

5. The computer-implemented method of any of clauses 1, 2, 3, and 4, wherein the first set of design criteria includes a first set of functions describing the dynamic behavior of the first mechanical assembly design, and the first set of functions includes at least one of an objective function and a constraint function.

6. The computer-implemented method of any of clauses 1, 2, 3, 4, and 5, wherein the first set of engineering criteria includes a first set of functions related to producing the first mechanical assembly design, and the first set of functions includes at least one of an objective function and a constraint function.

7. The computer-implemented method of any of clauses 1, 2, 3, 4, 5, and 6, wherein subdividing the first generative area into a plurality of subdivisions comprises placing a set of boundaries within the first generative area according to a subdivision strategy that indicates a position and an orientation for each boundary included in the set of boundaries.

8. The computer-implemented method of any of clauses 1, 2, 3, 4, 5, 6, and 7, further comprising identifying a first non-generative area within the first volumetric region based on the second set of criteria, wherein the second set of criteria indicates that the first non-generative area includes one or more components included in the first mechanical assembly design that are not included in the first group of components.

9. The computer-implemented method of any of clauses 1, 2, 3, 4, 5, 6, 7, and 8, wherein generating geometry within a given subdivision included in the plurality of subdivisions comprises initiating a generative design process at one or more boundaries bordering the given subdivision.

10. The computer-implemented method of any of clauses 1, 2, 3, 4, 5, 6, 7, 8, and 9, further comprising: evaluating a first objective function based on the first consolidated component to generate a first result, wherein the first objective function is included in the third set of criteria and comprises a mathematical expression that should be minimized; evaluating the first objective function based on the first group of components to generate a second result; and determining that the second result is greater than the first result, thereby indicating that the first consolidated component minimized the mathematical expression, wherein the first group of components is replaced by the first consolidated component upon determining that the second result is greater than the first result.

11. Some embodiments include a non-transitory computer-readable medium storing program instructions that, when executed by a processor, cause the processor to automatically design mechanical assemblies by performing the steps of: determining a first group of components included in a first mechanical assembly design based on a first set of criteria; generating a first volumetric region that encapsulates the first group of components; identifying a first generative area within the first volumetric region based on a second set of criteria; subdividing the first generative area into a first plurality of subdivisions; generating geometry within each subdivision included in the first plurality of subdivisions based on a third set of criteria to form a first consolidated component; and replacing the first group of components with the first consolidated component to generate a modified mechanical assembly design, wherein the modified mechanical assembly design is mechanically simpler than the first mechanical assembly design.

12. The non-transitory computer-readable medium of clause 11, wherein the first set of criteria indicates that each component included in the first group of components should be coupled to at least one other component included in the first group of components.

13. The non-transitory computer-readable medium of any of clauses 11 and 12, wherein the second set of criteria indicates that the first generative area does not include any components included in the first mechanical assembly design that are not included in the first group of components.

14. The non-transitory computer-readable medium of any of clauses 11, 12, and 13, wherein the third set of criteria includes a first set of design criteria and a first set of engineering criteria.

15. The non-transitory computer-readable medium of any of clauses 11, 12, 13, and 14, wherein the first set of design criteria includes a first set of functions describing the dynamic behavior of the first mechanical assembly design, and the first set of functions includes at least one of an objective function and a constraint function.

16. The non-transitory computer-readable medium of any of clauses 11, 12, 13, 14, and 15, wherein the first set of engineering criteria includes a first set of functions related to producing the first mechanical assembly design, and the first set of functions includes at least one of an objective function and a constraint function.

17. The non-transitory computer-readable medium of any of clauses 11, 12, 13, 14, 15, and 16, wherein the step of subdividing the first generative area into a plurality of subdivisions comprises placing a set of boundaries within the first generative area according to a subdivision strategy that indicates a position and an orientation for each boundary included in the set of boundaries, and further comprising the step of identifying a first non-generative area within the first volumetric region based on the second set of criteria, wherein the second set of criteria indicates that the first non-generative area includes one or more components included in the first mechanical assembly design that are not included in the first generative area.

18. The non-transitory computer-readable medium of any of clauses 11, 12, 13, 14, 15, 16, and 17, further comprising the steps of: subdividing the first generative area into a second plurality of subdivisions according to a subdivision strategy; generating geometry within each subdivision included in the second plurality of subdivisions based on the third set of criteria to form a second consolidated component; and comparing the first consolidated component to the second consolidated component based on the third set of criteria and determining that the first consolidated component should replace the first group of components.

19. The non-transitory computer-readable medium of any of clauses 11, 12, 13, 14, 15, 16, 17, and 18, wherein the step of comparing the first consolidated component to the second consolidated component comprises: evaluating a first objective function based on the first consolidated component to generate a first result, wherein the first objective function is included in the third set of criteria and comprises a mathematical expression that should be minimized; evaluating the first objective function based on the second consolidated component to generate a second result; and determining that the second result is greater than the first result, thereby indicating that the first consolidated component minimizes the mathematical expression.

20. Some embodiments include a system for automatically designing mechanical assemblies, comprising: a memory storing a design engine; and a processor that, when executing the design engine, is configured to perform the steps of: determining a first group of components included in a first mechanical assembly design based on a first set of criteria, generating a first volumetric region that encapsulates the first group of components, identifying a first generative area within the first volumetric region based on a second set of criteria, subdividing the first generative area into a first plurality of subdivisions, generating geometry within each subdivision included in the first plurality of subdivisions based on a third set of criteria to form a first consolidated component, and replacing the first group of components with the first consolidated component to generate a modified mechanical assembly design, wherein the modified mechanical assembly design is mechanically simpler than the first mechanical assembly design.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a ""module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for automatically designing mechanical assemblies, the method comprising:
 determining a first group of components included in a first mechanical assembly design based on a first set of criteria;
 generating a first volumetric region that encapsulates the first group of components;
 identifying a first generative area within the first volumetric region based on a second set of criteria;
 subdividing the first generative area into a first plurality of subdivisions, wherein at least one subdivision included in the first plurality of subdivisions includes at least one component included in the first group of components;
 generating geometry within each subdivision included in the first plurality of subdivisions to form a first consolidated component by initiating generative growing of the geometry at one or more boundaries of each subdivision based on a third set of criteria; and replacing the first group of components with the first consolidated component to generate a modified mechanical assembly design, wherein the modified mechanical assembly design is mechanically simpler than the first mechanical assembly design.

2. The computer-implemented method of claim 1, wherein the first set of criteria indicates that each component included in the first group of components should be coupled to at least one other component included in the first group of components.

3. The computer-implemented method of claim 1, wherein the second set of criteria indicates that the first generative area does not include any components included in the first mechanical assembly design that are not included in the first group of components.

4. The computer-implemented method of claim 1, wherein the third set of criteria includes a first set of design criteria and a first set of engineering criteria.

5. The computer-implemented method of claim 4, wherein the first set of design criteria includes a first set of functions describing the dynamic behavior of the first mechanical assembly design, and the first set of functions includes at least one of an objective function and a constraint function.

6. The computer-implemented method of claim 4, wherein the first set of engineering criteria includes a first set of functions related to producing the first mechanical assembly design, and the first set of functions includes at least one of an objective function and a constraint function.

7. The computer-implemented method of claim 1, wherein subdividing the first generative area into a plurality of subdivisions comprises placing a set of boundaries within the first generative area according to a subdivision strategy that indicates a position and an orientation for each boundary included in the set of boundaries.

8. The computer-implemented method of claim 1, further comprising identifying a first non-generative area within the first volumetric region based on the second set of criteria, wherein the second set of criteria indicates that the first non-generative area includes one or more components included in the first mechanical assembly design that are not included in the first group of components.

9. The computer-implemented method of claim 1, further comprising:
evaluating a first objective function based on the first consolidated component to generate a first result, wherein the first objective function is included in the third set of criteria and comprises a mathematical expression that should be minimized;
evaluating the first objective function based on the first group of components to generate a second result; and
determining that the second result is greater than the first result, thereby indicating that the first consolidated component minimized the mathematical expression, wherein the first group of components is replaced by the first consolidated component upon determining that the second result is greater than the first result.

10. The computer-implemented method of claim 1, wherein the geometry within each subdivision is generated via a multi-objective solver that is implemented by at least one of a graphics processing unit (GPU) or an Application specific integrated circuit (ASICs).

11. The computer-implemented method of claim 1, wherein the one or more boundaries of each subdivision define initialization points for the generative growing of the geometry.

12. A non-transitory computer-readable medium storing program instructions that, when executed by a processor, cause the processor to automatically design mechanical assemblies by performing the steps of:
determining a first group of components included in a first mechanical assembly design based on a first set of criteria;
generating a first volumetric region that encapsulates the first group of components;
identifying a first generative area within the first volumetric region based on a second set of criteria;
subdividing the first generative area into a first plurality of subdivisions, wherein at least one subdivision included in the first plurality of subdivisions includes at least one component included in the first group of components;
generating geometry within each subdivision included in the first plurality of subdivisions to form a first consolidated component by initiating generative growing of the geometry at one or more boundaries of each subdivision based on a third set of criteria; and
replacing the first group of components with the first consolidated component to generate a modified mechanical assembly design, wherein the modified mechanical assembly design is mechanically simpler than the first mechanical assembly design.

13. The non-transitory computer-readable medium of claim 12, wherein the first set of criteria indicates that each component included in the first group of components should be coupled to at least one other component included in the first group of components.

14. The non-transitory computer-readable medium of claim 12, wherein the second set of criteria indicates that the first generative area does not include any components included in the first mechanical assembly design that are not included in the first group of components.

15. The non-transitory computer-readable medium of claim 12, wherein the third set of criteria includes a first set of design criteria and a first set of engineering criteria.

16. The non-transitory computer-readable medium of claim 15, wherein the first set of design criteria includes a first set of functions describing the dynamic behavior of the first mechanical assembly design, and the first set of functions includes at least one of an objective function and a constraint function.

17. The non-transitory computer-readable medium of claim 15, wherein the first set of engineering criteria includes a first set of functions related to producing the first mechanical assembly design, and the first set of functions includes at least one of an objective function and a constraint function.

18. The non-transitory computer-readable medium of claim 12, wherein the step of subdividing the first generative area into a plurality of subdivisions comprises placing a set of boundaries within the first generative area according to a subdivision strategy that indicates a position and an orientation for each boundary included in the set of boundaries, and further comprising the step of identifying a first non-generative area within the first volumetric region based on the second set of criteria, wherein the second set of criteria indicates that the first non-generative area includes one or more components included in the first mechanical assembly design that are not included in the first generative area.

19. The non-transitory computer-readable medium of claim 12, further comprising the steps of:
subdividing the first generative area into a second plurality of subdivisions according to a subdivision strategy;

generating geometry within each subdivision included in the second plurality of subdivisions based on the third set of criteria to form a second consolidated component; and comparing the first consolidated component to the second consolidated component based on the third set of criteria and determining that the first consolidated component should replace the first group of components.

20. The non-transitory computer-readable medium of claim 19, wherein the step of comparing the first consolidated component to the second consolidated component comprises:

evaluating a first objective function based on the first consolidated component to generate a first result, wherein the first objective function is included in the third set of criteria and comprises a mathematical expression that should be minimized;

evaluating the first objective function based on the second consolidated component to generate a second result; and determining that the second result is greater than the first result, thereby indicating that the first consolidated component minimizes the mathematical expression.

21. A system for automatically designing mechanical assemblies, comprising:

a memory storing a design engine; and a processor that, when executing the design engine, is configured to perform the steps of:

determining a first group of components included in a first mechanical assembly design based on a first set of criteria, generating a first volumetric region that encapsulates the first group of components, identifying a first generative area within the first volumetric region based on a second set of criteria, subdividing the first generative area into a first plurality of subdivisions, wherein at least one subdivision included in the first plurality of subdivisions includes at least one component included in the first group of components, generating geometry within each subdivision included in the first plurality of subdivisions to form a first consolidated component by initiating generative growing of the geometry at one or more boundaries of each subdivision based on a third set of criteria; and replacing the first group of components with the first consolidated component to generate a modified mechanical assembly design, wherein the modified mechanical assembly design is mechanically simpler than the first mechanical assembly design.

22. A computer-implemented method for automatically designing mechanical assemblies, the method comprising:

determining a first group of components included in a first mechanical assembly design based on a first set of criteria;

generating a first volumetric region that encapsulates the first group of components;

identifying a first generative area within the first volumetric region based on a second set of criteria;

subdividing the first generative area into a first plurality of subdivisions;

generating geometry within each subdivision included in the first plurality of subdivisions to form a first consolidated component by initiating generative growing of the geometry at one or more boundaries of each subdivision based on a third set of criteria;

subdividing the first generative area into a second plurality of subdivisions;

generating geometry within each subdivision included in the second plurality of subdivisions to form a second consolidated component;

comparing the first consolidated component to the second consolidated component based on the third set of criteria; and replacing, based on the comparing, the first group of components with the first consolidated component to generate a modified mechanical assembly design, wherein the modified mechanical assembly design is mechanically simpler than the first mechanical assembly design.

* * * * *